United States Patent [19]
Helser

[11] Patent Number: 5,359,155
[45] Date of Patent: Oct. 25, 1994

[54] ILLUMINATION APPARATUS FOR A DIGITIZER TABLET

[75] Inventor: George Helser, Gaithersburg, Md.

[73] Assignee: Tiger Scientific Corp., Gaithersburg, Md.

[21] Appl. No.: 36,701

[22] Filed: Mar. 25, 1993

[51] Int. Cl.$^5$ ............................................. G08C 21/00
[52] U.S. Cl. ........................................ 178/18; 178/87; 345/173; 345/175; 345/176
[58] Field of Search ...................... 178/18, 19, 20, 87; 345/173, 175, 176; 362/31

[56] References Cited

U.S. PATENT DOCUMENTS

| | | |
|---|---|---|
| 3,023,304 | 8/1958 | Peterson . |
| 3,752,974 | 8/1973 | Baker et al. . |
| 4,206,314 | 6/1980 | Prugh et al. . |
| 4,285,889 | 8/1981 | Parsons . |
| 4,373,282 | 2/1983 | Wragg . |
| 4,729,067 | 3/1988 | Ohe . |
| 4,811,507 | 3/1989 | Blanchet . |
| 4,873,398 | 10/1989 | Hussy, Jr. .............................. 178/18 |
| 4,937,709 | 6/1990 | Yanagi et al. . |
| 4,943,689 | 7/1990 | Siefer et al. . |
| 4,963,859 | 10/1990 | Parks ...................................... 345/176 |
| 4,973,800 | 11/1990 | Sindeband et al. . |
| 4,974,122 | 11/1990 | Shaw . |
| 4,977,486 | 12/1990 | Gotoh .............................. 345/175 X |
| 4,985,809 | 1/1991 | Matsui et al. . |
| 5,001,306 | 3/1991 | Purcell . |
| 5,028,744 | 7/1991 | Purcell et al. . |
| 5,093,765 | 3/1992 | Kashima et al. . |
| 5,130,898 | 7/1992 | Akahane . |
| 5,134,549 | 7/1992 | Yokoyama . |
| 5,153,386 | 10/1992 | Siefer et al. . |
| 5,178,447 | 1/1993 | Murase et al. . |

FOREIGN PATENT DOCUMENTS 834837 of 0000 Fed. Rep. of Germany .
1099079 of 0000 France .
664193 of 0000 United Kingdom .

OTHER PUBLICATIONS

"Piping Light with Acrylic Materials", Modern Plastics, Aug. 1946.
"Methods for Lighting Panels; Why Backlighting is Best", Electronic Design, Aug. 2, 1961, p. 47.

*Primary Examiner*—Stephen Chin
*Assistant Examiner*—Paul Loomis
*Attorney, Agent, or Firm*—Marvin S. Towsend

[57] ABSTRACT

An illumination apparatus is provided for an opaque digitizer tablet. The illumination apparatus can be used to convert the opaque digitizer into a back-lit digitizer. The illumination apparatus includes an aperture fluorescent lamp located peripheral to the portion of the working surface used for placement of the an object to be digitized and includes a non-optical-fiber flat light conductor (a slab waveguide) located on top of and covering the portion of the working surface used for the object to be digitized. Light conducted from the lamp emerges from the top surface of the non-optical-fiber flat light conductor for back lighting the object to be digitized. A reflective surface is located under the non-optical-fiber flat light conductor for reflecting scattered light, that emerges from a bottom surface of the non-optical-fiber flat light conductor, toward the object to be digitized. For optimum back lighting, the bottom surface of the non-optical-fiber flat light conductor includes a pattern of roughened portions which includes a region of lesser roughness nearer to the light source and a region of greater roughness farther from the light source. A panel-shaped optical conveyance is used to convey light from the light source to an edge of the non-optical-fiber flat light conductor. The roughened portions provide a slab waveguide with an imperfect boundary.

30 Claims, 5 Drawing Sheets

ILLUMINATION APPARATUS FOR A DIGITIZER TABLET

FIELD OF THE INVENTION

The present invention relates to the field of digitizer tablets, and more particularly to sources of illumination for providing back-lighting for an object, placed on the tablet, to be digitized.

BACKGROUND OF THE INVENTION

Digitizer tablets are well known in the art. In certain applications, it is necessary or highly desirable to back-light the object that is being digitized. The object to be digitized is most often a thin, flat material such as maps, drawings, photos, or other graphic data, made of paper, film, or other translucent materials. These materials are often large format (up to 44×60 inches in size).

Back-lighting of the material being digitized may be accomplished by using what is commonly known as a back-lit digitizer. Back-lit digitizers, like those described in U.S. Pat. No. 4,943,689 (Siefer and Purcell), have a number of undesirable characteristics when compared to the same type of digitizer in an opaque configuration (i.e. without the modifications to make it back-lit).

This back-lit digitizer, has a number of similarities with other back-lit digitizers. The grid for detecting digitizer position is built into a tablet made of translucent materials. The translucent tablet is placed on top of a box containing fluorescent lamps. This translucent tablet/light box configuration has many inherent drawbacks. These back-lit digitizers have a grid like structure of opaque electrical conductors within the working surface of the tablet. They use light diffusing materials to hide the shadows caused by the opaque conductors. They may also have a perforated metallic shield. The result is that the illuminatable area is relatively opaque and therefore inefficient at passing light. This inefficiency requires a great number of lamps, and associated lamp ballasts, relative to the light available at the working surface.

U.S. Pat. No. 4,943,689 shows a back-lit digitizer with 20 lamps, 6 ballasts and 4 cooling fans. The cooling fans create some noise which is potentially bothersome when trying to do precise digitizing for long periods of time. The fans may wear out and require periodic replacement. The heat must be absorbed by the room air conditioning system. The lamps are operated underneath the digitizing work surface so, heat from the lamps may cause expansion of the work surface which degrades accuracy.

Current back-lit digitizers also present a weight problem. A typical opaque digitizer tablet, with a 36×48 inches working surface may typically weigh 50 pounds and have a thickness of 1.5 inches. In contrast, a typical back-lit digitizer tablet with a 36×48 inches working surface may typically weigh 150 pounds and have a thickness of 8 inches.

The added thickness and weight of these back-lit digitizers present a problem of mounting the digitizer. As these digitizers are often of large format (e.g. 24×36 inches, 36×48 inches, or 44×60 inches) it is necessary to mount them on a pedestal which allows the user to adjust the tilt and height. Tilt and height adjustment allows the user to reach all areas of the work surface and to vary his/her position to minimize fatigue.

Standard opaque digitizing tablets are safely mounted on ordinary adjustable drafting table pedestals. To carry the additional weight of a back-lit tablet, a more sturdy and more expensive pedestal is used, which may have an electrically operated motor to raise and lower the heavy tablet.

The thickness of a back-lit tablet moves the center of mass several inches from the pivot point of the tilt mechanism on a pedestal. To safely tilt the back-lit tablet, manufacturers often recommend a pedestal with a costly motorized tilt feature.

Back-lit tablets are known to be structurally weak when compared to opaque tablets. This is because the tablet is made without a solid backing so that back-lighting will illuminate it. If a back-lit tablet is made with plastics, it may flex or droop from gravity or pressure during use. Flex or droop may degrade the accuracy of the digitizer. If a back-lit tablet is made of glass it may be less prone to flexing, but these glass tablets are fragile and have been known to break during shipment or use. The most popular method of constructing a grid array, for use in an opaque digitizing tablet, is by photo-etching a copperclad FR4 substrate (like the "printed circuit boards" used in personal computers). This type of grid is very accurate and repeatable to make. Unfortunately, it makes for a poor back-lit tablet because the grid lines are wide enough to cause shadows which are hard to diffuse, and the FR4 material is a poor conductor of light.

Another method of making grid arrays is to print a conductive ink on non-conducting material. However, to achieve sufficient reliability and conductivity, the printed grid lines are very wide and produce shadows that are very hard to diffuse, if used in a back-lit design. For these reasons, some manufacturers make their back-lit tablets using, what is known in the industry as, "strung wire" grids. These grid arrays are made of fine wires which are glued/potted in place on a transparent or translucent sheet.

The fine wire grid creates smaller shadows which are more easily diffused, but this grid making technique has manufacturing problems. Strung wire grids tend to be labor intensive to build and prone to flaws. One kinked or slightly misplaced grid wire can cause a completed digitizer tablet to be scrapped, or sold as a low accuracy model. This is especially a problem because the typical customer requiring a back-lit digitizer, usually requires the highest accuracy digitizer available.

Some digitizer designs have such a dense grid of opaque conductors, it is impractical to back-light.

Digitizing tablets are made of electronic and mechanical components. While the electronic components may be identical in a standard opaque digitizer and a back-lit digitizer, there are great differences in the mechanical components between the two types of digitizers. It is easy to see, in the U.S. Pat. No. 4,943,689 that the mechanical components related to the back-lighting are quite substantial as compared to the mechanical components related to the grid array section that would be used only in an opaque digitizer. The added mechanical complexity and cost of back-lighting was not so serious a marketing concern when the cost of the electronics was a major part of the cost of the digitizer. However, in recent years, the cost of the electronic components in a digitizer has fallen drastically. This has been followed by a similar reduction in the list prices of opaque digitizers.

However, as the prices of opaque digitizers have fallen, the prices of back-lit digitizers have changed little. The added mechanical complexity and cost of back-lighting has become a major cost in a back-lit digitizer. This can be seen in pricing as back-lit digitizers are now typically double the price of an equivalent opaque digitizer.

Back-lit tablets typically use transparent or translucent materials to glue the layers together and/or hold the grid wires in place. With age, these materials have been known to yellow or darken, so that the illumination of the working surface is dimmed.

Surface-lit digitizers, with optical fibers, as described in U.S. Pat. No. 5,001,306 (Purcell) and U.S. Pat. No. 5,153,386 (Siefer and Purcell), were developed in an attempt to overcome the problems of back-lit digitizers. However, these surface-lit digitizers have failed to be a great market success because they are expensive to make and impractical to build in sizes greater than 17×24 inches. This is quite a disadvantage since the most popular back-lit digitizers are 24×36 inches and larger. These fiber optic surface-lit tablets are complex structures to build. They consist of several layers of materials which must be carefully laminated to avoid optical defects. At least one layer of such materials is a layer of a plurality of discrete optical fibers. Although these surface-lit designs do not have to illuminate through a grid of opaque conductors, the light is emitted from discrete fibers. These patents describe the use of a diffuser layer placed over the discrete fibers to give even lighting. The diffuser reduces the light efficiency of the system, which requires the use of added candlepower for the desired illumination level. The diffuser also adds to the thickness of the light panel, which places the digitizing transducer further from the tablet grid array. This added distance is undesirable because it can reduce the accuracy of the digitizer.

Another system for surface-lit lighting employs electroluminescent lighting, as described in U.S. Pat. No. 5,153,386, does not appear to have been commercially marketed perhaps due to the light intensity being inadequate to generate sufficient illumination to back-light a paper map, and the non-white color may be objectionable. Digitizer tablets require a flat, incompressible, and stable work surface for best digitizing accuracy. Back-lit and surface-lit digitizers as are generally known to the art, are made from layers of materials. The layers are often constructed with deliberate air gaps to prevent undesirable optical effects such as dark spots or rainbows in the illuminated work surface. This layering with air gaps tend to make the work surface flexible and compressible, which may reduce digitizer accuracy.

The foregoing disadvantages are overcome by the unique illumination apparatus for a digitizer tablet of the present invention as will be made apparent from the following description thereof. Other advantages of the present invention over the prior art also will be rendered evident.

SUMMARY OF THE INVENTION

Accordingly, it is an object of the present invention to provide an illumination apparatus for a digitizer tablet to back-light the material placed on a digitizing tablet for easier viewing while digitizing.

Still another object of the present invention is to provide an illumination apparatus for a digitizer tablet by which an ordinary opaque digitizer can be upgraded, by the user, for back-lit digitizing.

Yet another object of the present invention is to provide an illumination apparatus for a digitizer tablet in which lamps need not be placed under the working surface.

Even another object of the present invention is to provide an illumination apparatus for a digitizer tablet in which cooling fans are not required so operation is silent and maintenance is reduced.

Still a further object of the present invention is to provide an illumination apparatus for a digitizer tablet that be safely used with an inexpensive drafting pedestal.

Yet another object of the present invention is to provide an illumination apparatus for a digitizer tablet which can be used with digitizers having grids that are too opaque to be back-lit.

Still another object of the present invention is to provide an illumination apparatus for a digitizer tablet that can be used with digitizers having inexpensive, and accurate grids which are difficult to back-light.

Yet another object of the present invention is to provide an illumination apparatus for a digitizer tablet wherein the digitizer structure need not conduct light, so that it can be made of inexpensive, durable and rigid materials.

Still another object of the present invention is to provide an illumination apparatus for a digitizer tablet that employs few lamps.

Yet another object of the present invention is to provide an illumination apparatus for a digitizer tablet with which power consumption is low.

Still a further object of the present invention is to provide an illumination apparatus for a digitizer tablet in which few parts are required.

Still another object of the present invention is to provide an illumination apparatus for a digitizer tablet that will not heat the working surface.

Yet another object of the present invention is to provide an illumination apparatus for a digitizer tablet which does not employ adhesives or potting compounds, which might yellow or darken so that the illumination of the working surface dims with age.

Still another object of the present invention is to provide an illumination apparatus for a digitizer tablet that is light weight.

Yet another object of the present invention is to provide an illumination apparatus for a digitizer tablet that has a thin profile.

Still a further object of the present invention is to provide an illumination apparatus for a digitizer tablet that has a center of mass close to the mounting point.

Still another object of the present invention is to provide an illumination apparatus for a digitizer tablet that is relatively low in cost.

Yet another object of the present invention is to provide an illumination apparatus for a digitizer tablet that produces a light whose colors are close to natural sunlight.

Still a further object of the present invention is to provide an illumination apparatus for a digitizer tablet that precludes the presence of shadows or rainbows.

Still another object of the present invention is to provide an illumination apparatus for a digitizer tablet that has a lighting surface of uniform thickness.

Yet another object of the present invention is to provide an illumination apparatus for a digitizer tablet that is non-compressible.

Still a further object of the present invention is to provide an illumination apparatus for a digitizer tablet that is simple to manufacture.

Still another object of the present invention is to provide an illumination apparatus for a digitizer tablet that spreads light evenly with uneven light sources, and without the need for diffusers that would block light.

Additional objects, advantages, and novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, an illumination apparatus is provided for an opaque digitizer tablet which has a handheld digitizing member and an associated conductor arrangement embedded in the tablet. The apparatus includes a non-optical-fiber flat light conductor located on top of and covering the conductor arrangement embedded in the digitizer tablet. The non-optical-fiber flat light conductor includes a top surface, a bottom surface, and a light-receiving edge. A light source is located peripheral to the non-optical-fiber flat light conductor. The light source provides light to the light-receiving edge of the non-optical-fiber flat light conductor. A portion of light received by the light-receiving edge from the light source is emitted from the top surface for back lighting the object to be digitized placed over the non-optical-fiber flat light conductor.

Often a digitizer tablet includes a conductor arrangement (which is often a plurality of conductors arranged in a grid array), an opaque working surface, and a portion of the working surface used for placement of an object to be digitized. In this case, the illumination apparatus of the invention can be used to convert the opaque digitizer into a back-lit digitizer. In this case, the illumination apparatus includes a light source located peripheral to the portion of the working surface used for placement of the object to be digitized and includes a non-optical-fiber flat light conductor located on top of and covering the portion of the working surface used for placement upon of an object to be digitized. In this respect, the non-optical-fiber flat light conductor serves as a new working surface covering the original working surface of the opaque digitizer. The non-optical-fiber flat light conductor is also known as a slab waveguide.

Alternatively, the illumination apparatus can be built in to be part of a digitizer tablet. In this respect, the non-optical-fiber flat light conductor serves as the original working surface.

The non-optical-fiber flat light conductor includes a top surface and a light-receiving edge. A portion of light received by the light-receiving edge from the light source is emitted from the top surface for back-lighting the object to be digitized. A reflective surface is located under the non-optical-fiber flat light conductor for reflecting scattered light, that emerges from a bottom surface of the non-optical-fiber flat light conductor, toward the object to be digitized. The reflective surface reduces the granularity and improves brightness of the object which is back-lit. A matte surface on the reflective surface improves granularity.

To provide optimum back-lighting for the object to be digitized, the non-optical-fiber flat light conductor includes a surface which includes roughened portions. The pattern of roughened portions includes a region of lesser roughness nearer the light source and a region of greater roughness farther from the light source. The roughened portions can be in the form of a matte surface.

Stated in somewhat different terms, the slab waveguide (the non-optical-fiber flat light conductor) has an imperfect boundary. The term "imperfect boundary" is understood to mean an optically imperfect boundary. Another desirable characteristic of the slab waveguide is that it is multimode; that is, it accepts many different light frequencies.

For purposes of describing the present invention, the terms imperfect-boundary-containing slab waveguide, non-optical-fiber containing flat light conductor, and flat light conductor are synonymous.

A curved panel-shaped optical conveyance is used to convey light from an elevated light source to an edge of the non-optical-fiber flat light conductor.

More specifically, the panel-shaped optical conveyance includes a first portion located in a plane of the flat light conductor and a second portion which may be located in an elevated plane parallel to the plane of the flat light conductor and adjacent to the light source. The panel-shaped optical conveyance conveys light from the light source to an edge of the flat light conductor.

The panel-shaped optical conveyance may include expansion slots in one surface of the panel-shaped optical conveyance to expand without warping when heated by the light from the light source.

The panel-shaped optical conveyance includes a first edge portion located in a plane which is parallel to an edge of the non-optical-fiber flat light conductor and a second edge portion located in a plane adjacent to and facing a portion of the light source. The panel-shaped optical conveyance conveys light from the portion of the light source adjacent to and facing the second edge portion of the panel-shaped optical conveyance to the edge of the non-optical-fiber flat light conductor.

The first edge portion and the second edge portion of the panel-shaped optical conveyance and the portion of the light source adjacent to and facing the second edge portion may be coplanar.

The first edge portion of the panel-shaped optical conveyance may be in a plane below the second edge portion of the panel-shaped optical conveyance and the portion of the light source adjacent to and facing the second edge portion.

The first edge portion of the panel-shaped optical conveyance may be in a plane above the second edge portion of the panel-shaped optical conveyance and the portion of the light source adjacent to and facing the second edge portion.

The panel-shaped optical conveyance may include a curved cross-sectional contour. The curved panel-shaped optical conveyance conveys light from the portion of the light source adjacent to and facing the second edge portion, located above the non-optical-fiber flat light conductor, to an edge of the non-optical-fiber flat light conductor.

The panel-shaped optical conveyance may include an input end and an output end. The input end and the output end are oriented with respect to each other such that an angle therebetween, with reference to the top surface of the non-optical-fiber flat light conductor, is an angle in a range of 0-180 degrees. The angled panel-shaped optical conveyance conveys light from the light source, located above, below, or beside the non-optical-fiber flat light conductor, to an edge of the non-optical-fiber flat light conductor. The light conveyed through the panel-shaped optical conveyance is conveyed by total internal reflection.

The light source is preferably an aperture fluorescent lamp. The aperture is wider than an adjacent end of the panel-shaped optical conveyance. (Aperture fluorescent lamps are available from Interlectric Corporation of Warren Pa., Light Sources of Milford Conn., and Voltarc Tubes of Fairfield Conn.)

A portion of the light emitted from the aperture fluorescent lamp enters the panel-shaped optical conveyance. Most of the light entering the panel-shaped optical conveyance is totally internally reflected and is emitted from the edge facing the flat light conductor.

A portion of the light emitted from the edge of the panel-shaped optical conveyance enters the edge of the flat light conductor. The top of the flat light conductor is smooth. A perimeter portion of the bottom surface of the flat light conductor is smooth and provides total internal reflection, and an internal portion of the bottom surface of the flat light conductor is roughened and permits light to be scattered and emerge upward to the object to be digitized. The light emerging from the top surface of the flat light conductor serves to illuminate, by back-lighting, an object to be digitized placed on the top surface of the flat light conductor. The flat light conductor may include a nonhomogeneous pattern of roughness. The nonhomogeneous pattern of roughness may include a region of lesser roughness nearer to the light source and a region of greater roughness farther from the light source.

A light shield may be located between the light source and the top surface of the flat light conductor for preventing light from the light source from entering the flat light conductor from the top surface of flat light conductor.

A cover is provided for the light source, and the cover shields stray light from the user's eyes. A gap is located between the cover and the working surface of the digitizer tablet. The gap allowing air to enter the cover for cooling the light source.

The metal conduit used for carrying electrical conductors for powering the light source is located inside the cover but above the light source and far from the digitizer grid array so that the metal parts will not cause distortion of the digitizing field.

When the digitizing circuitry is turned off, the illumination apparatus of the invention can be used as a light table or drafting table.

Still other objects of the present invention will become readily apparent to those skilled in this art from the following description, wherein there is shown and described a preferred embodiment of this invention. Simply by way of illustration, the invention will be set forth in part in the description that follows and in part will become apparent to those skilled in the art upon examination of the following or may be learned with the practice of the invention. Accordingly, the drawings and descriptions will be regarded as illustrative in nature and not restrictive.

BRIEF DESCRIPTION OF THE DRAWINGS

The accompanying drawings incorporated in and forming a part of the specification, illustrate several aspects of the present invention, and together with the description serve to explain the principles of invention. In the drawings.

DETAILED DESCRIPTION OF PREFERRED EMBODIMENTS

Figure 1:
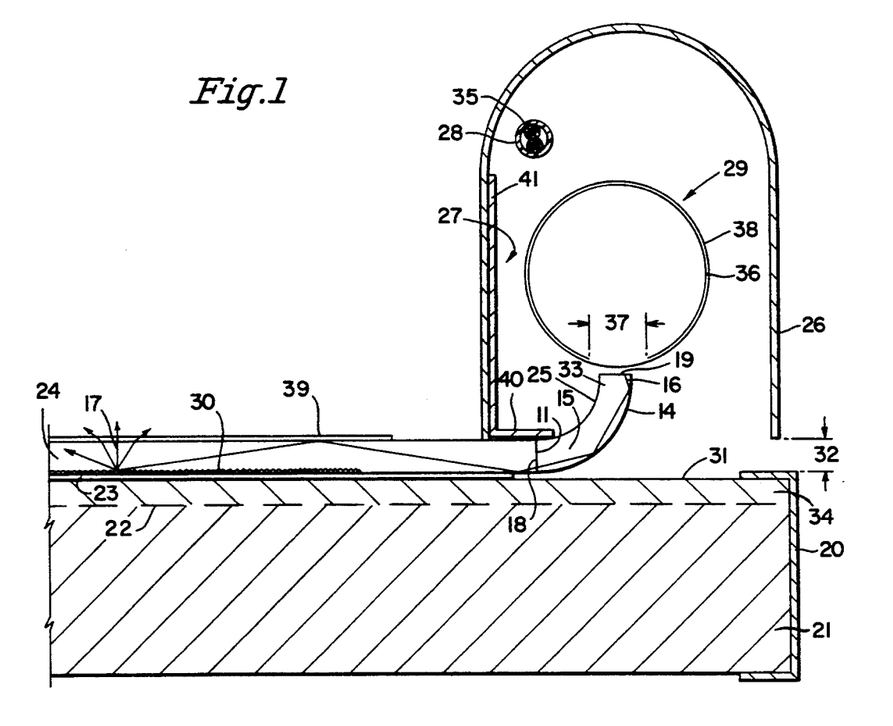
FIG. 1 is a cross-section of part of an illumination apparatus of the invention added-on to an opaque digitizer.

FIG. 1, shows a cross-section of part of an illumination apparatus for a digitizer tablet of the invention with an added-on imperfect-boundary-containing slab waveguide. An illumination source 29 projects light rays including light ray 16 into a curved panel-shaped light conductor 25. The panel-shaped light conductor 25 includes a first edge portion 18 located in a plane which is parallel to an edge 11 of the non-optical-fiber flat light conductor 24 (also known as a slab waveguide) and a second edge portion 19 located in a plane adjacent to and facing a portion of the light source 29. The panel-shaped light conductor 25 conveys light from the portion of the light source 29 adjacent to and facing the second edge portion 19 of the panel-shaped light conductor 25 to the edge 11 of the non-optical-fiber flat light conductor 24.

Figures 7, 8:
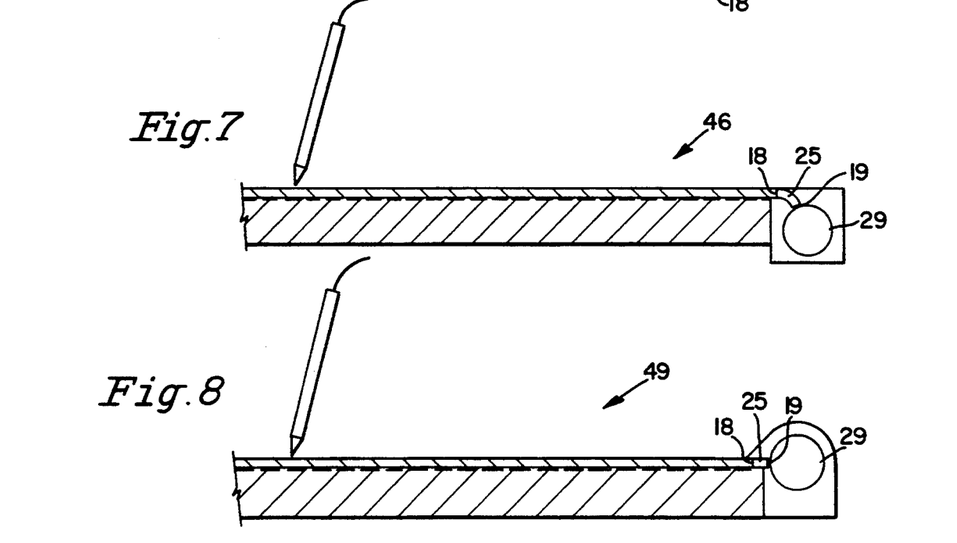
FIG. 7 is a cross-section of part of an opaque digitizer tablet with the illumination apparatus of the invention built in and with the light source below the flat light conductor. A curved panel-shaped optical conveyance is used between the light source and the non-optical-fiber flat light conductor.
FIG. 8 is a cross-section of part of an opaque digitizer tablet with the illumination apparatus of the invention built in and with the light source in the same plane as the non-optical-fiber flat light conductor. A flat panel-shaped optical conveyance is used between the light source and the non-optical-fiber flat light conductor.

In FIG. 8, the first edge portion 18 and the second edge portion 19 of the panel-shaped light conductor 25 and the portion of the light source 29 adjacent to and facing the second edge portion 19 are coplanar.

Figure 5:
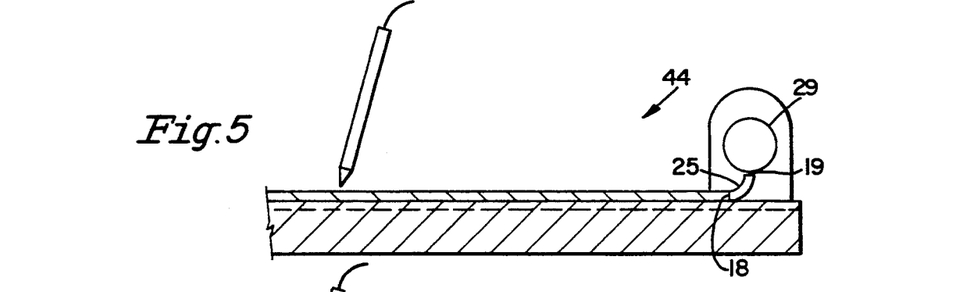
FIG. 5 is a cross-section of a part of a typical opaque digitizer tablet with the illumination apparatus of the invention added on and with the light source above the non-optical-fiber flat light conductor. A curved panel-shaped optical conveyance is used between the light source and the non-optical-fiber flat light conductor.

In FIGS. 1 and 5, the first edge portion 18 of the panel-shaped light conductor 25 is in a plane below the second edge portion 19 of the panel-shaped light conductor 25 and the portion of the light source 29 adjacent to and facing the second edge portion 19.

In FIG. 7, the first edge portion 18 of the panel-shaped light conductor 25 is in a plane above the second edge portion 19 of the panel-shaped light conductor 25 and the portion of the light source 29 adjacent to and facing the second edge portion 19.

As shown in FIG. 1, the panel-shaped light conductor 25 includes an input end 19 and an output end 18 at substantially right angles to each other. The right-angled panel-shaped optical conveyance conveys light from the light source 29, located above the non-optical-fiber flat light conductor 24, to an edge 11 of the non-optical-fiber flat light conductor 24. The light conveyed through the panel-shaped light conductor 25 is conveyed by total internal reflection.

More specifically, most of the light entering the curved light conductor is totally internally reflected and this light follows the path of the curved light conductor, where it enters the flat light conductor 24. The light entering the non-optical-fiber flat light conductor is totally internally reflected near the edge 11. As the light is conducted inward, it reaches an roughened surface area 30 where scattering occurs and some of the light is no longer totally internally reflected. This scattered light 17 is emitted from the flat light conductor and provides the desired illuminating effect. The reflective surface 23 increases the brightness of the useful light.

The curved light conductor allows the illumination source(s) to be placed above the plane of the flat light conductor so that the entire device can fit on top the digitizer tablet working surface 31. The digitizer tablet includes the grid array 22, the protective edge 20 and the structural core 21 and 34, of which the top surface 31 is called the working surface. The lamp cover 26, shields stray light from the user's eyes and covers the illumination source. The gap 32 allows air to enter for cooling of the illumination source. The light shield 27 prevents stray light from entering the flat light conductor at undesirable angles which would result in distracting glare. Electrical conductors 35 are carried in metallic tube 28 which is located far from the grid array 22 to prevent digitizing inaccuracy due to the metallic parts of 28 and 35 distorting the digitizer's operating field.

In FIG. 1 the light shield 27 prevents stray light produced by lamp 29 from being seen at the edges by the user. This light could prove distracting. The light shield 27 includes a first portion 40 located in a plane parallel to the plane of said flat light conductor 24. Also, the light shield 27 includes a second portion 41 which projects from said portion 40 of the light shield 27 and is located in a plane perpendicular to the plane of the flat light conductor 24. The light shield works effectively without tight mechanical sealing because the surfaces facing away from the lamp are textured and painted flat black. The sides facing the lamp are reflective to reduce heating effects from the lamp. The light shield is made of a non-metallic material so that it does not create any interference with the digitizer's operating field. Many materials are suitable. The preferred material and construction is an acrylic-PVC sheet which is cold formed in a break.

In FIG. 1 the lamp cover 26 provides protection for the lamp as well as light shielding. The preferred material and construction is thermoformed ABS. The lamp cover has an opening 32 which allows air to flow in for cooling the lamp with convective flow. Light leaks from this opening but it is of no consequence because it is not seen by the user.

Figure 2:
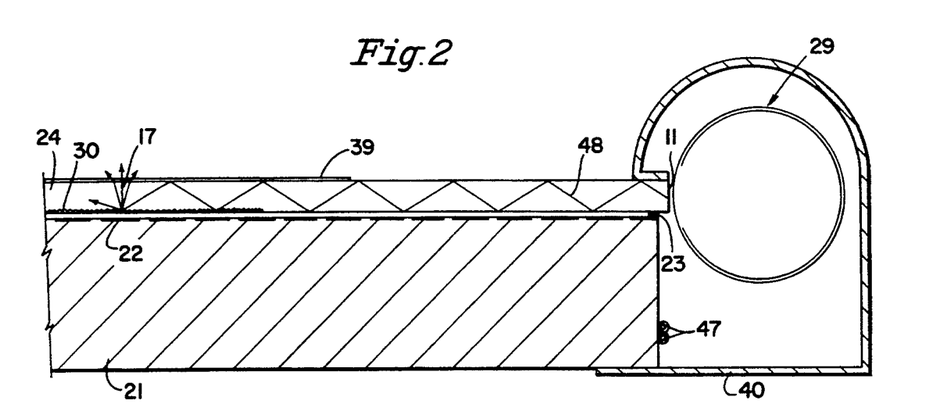
FIG. 2 is cross-section of part of an illumination apparatus the invention built in to an otherwise opaque digitizer.

In FIG. 2, a cross-section of part of an illumination apparatus for a digitizer tablet of the invention is shown with the imperfect-boundary-containing slab waveguide built-in as part of the overall digitizer apparatus. An illumination source 29 projects many rays of light, including ray 48, into a flat light conductor 24 (the slab waveguide). The light entering the flat light conductor is totally internally reflected near the edges. As the light is conducted inward, it reaches the roughened surface area 30 where scattering occurs and some of the light is no longer totally internally reflected. This scattered light is emitted from the flat light conductor and provides the desired back-lit illuminating effect through the object to be digitized 39. The reflective surface 23 increases the brightness of the useful light. In the built-in digitizer of FIG. 2, the digitizer tablet consists of the grid array 22, the structural core 21, the protective edge 40, the reflective surface 23, the non-optical-fiber flat light conductor 24 which serves as an original working surface, and the lamp 29 with associated structures. Electrical conductors 47 carry current, for the lamp, and are located far from the digitizer working surface, to prevent interference with the digitizer's operating field.

Preferably, the light source 29 is what is commonly known as an aperture fluorescent lamp. In FIG. 1, aperture fluorescent lamp 29 has an outer transparent glass tube 38, an internal translucent reflective coating 36, and an aperture 37 in the internal reflective coating 36. The aperture fluorescent lamp 29 concentrates its light output from an aperture 37 along the length of the lamp. Alternatively, the aperture fluorescent need not include an internal translucent coating; instead, an opaque inner coating can be employed. Aligning the lamp aperture 37 in FIG. 1 with one end 33 of the panel-shaped light conductor 25 in FIG. 1 and placing the lamp within about 0.1 inch of the panel-shaped light conductor 25, results in a great amount of light entering the panel-shaped light conductor 25. The lamp aperture is made about 50% larger than the adjacent end 33 of the light conductor 25 so that some mis-alignment, between the aperture 37 and the panel-shaped light conductor 25, will still result in a high amount of light transmitted into the panel-shaped light conductor 25. For digitizers 17×24 inches and larger, the preferred aperture lamp has a diameter of 1.5 inches with a preferred aperture of 30 degrees. Lamps can be made in a variety of lengths, but instead of making different size lamps for each size digitizer, it is convenient to use multiples of 24 inch long lamps. This 24 inch length is the overall physical lamp length including connectors and filament bases, which do not emit light. Bright light output from a 24 inch long lamp is about 20" in length. For digitizers 17×24 inches and smaller, it would be convenient to use multiples of 1 inch diameter lamps with a 12 inch length.

In FIG. 2 the digitizer tablet edge 40 serves as lamp cover, and light shield. It may be extruded of aluminum for strength. As this part is far enough from the active digitizing area the metallic material will not cause interference with the digitizer's operating field.

For preferred internal reflection characteristics, the curved panel-shaped light conductor 25 in FIG. 1 is preferably extruded in a manner that has shiny and smooth surfaces. It is preferably made with a constant radius and with a constant thickness, to match the flat light conductor 24. For example, with a 0.25 inch thick flat light conductor 24, a curved panel-shaped light conductor 25 is used which has an inner edge radius 0.50 inch and an outer edge radius of 0.75 inch. The angle of the curved panel-shaped light conductor 25 shown in FIG. 1 is 90 degrees but is may be of any angle that is required for optimum lamp placement. In other words, the input end 14 of the panel-shaped optical conductor 25 is at a 90 degree angle with respect to the output end 15 of the panel-shaped optical conductor 25. However, the smaller the angle, the lesser the light losses will be.

The panel-shaped light conductor 25 may be made of glass, polycarbonate, acrylic, or other light conductive materials. Transparency is very important. The preferred material is acrylic for its high conductivity of light, but if lamp heating is a problem, a polycarbonate material may be more suitable (due to its higher melt temperature and flammability resistance) but light conduction it will typically be poorer than acrylic.

Figure 16:
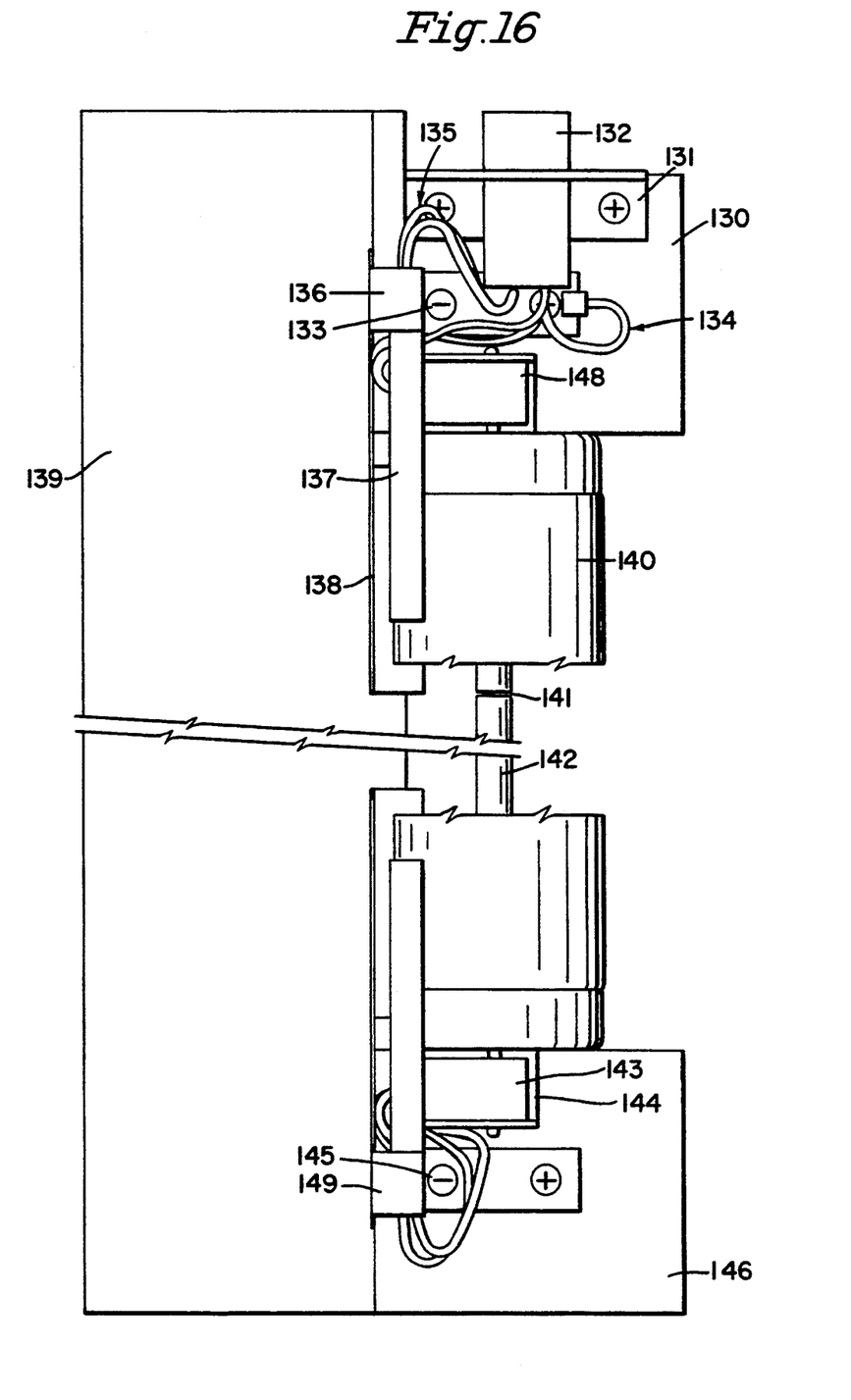
FIG. 16 is a top view of an illumination apparatus employing an add-on imperfect-boundary-containing slab waveguide of the invention showing the area around the lamp.

Heating of the curved panel-shaped light conductor 25 near the lamp 29, may tend to cause it to warp, due to its shape and uneven temperature. This warpage can be minimized by the use of expansion slots 141 such as shown in FIG. 16. Slots 141 are cut into the curved panel-shaped optical conductor 25 at about 8 inch intervals along the surface of the curved panel-shaped optical conductor 25 which is close to the lamp. The cuts are about ½ inch deep and about 1/32 inch wide. These cuts have no measurable effect on lighting. The curved panel-shaped optical conductor 25 may be held in place by gluing it to where it touches the flat light conductor 24 using a transparent glue. Using a transparent glue gives better light conduction between the two parts than if no glue is used at all. A variety of transparent glues are available including solvent types as well as UV curable types. If the flat and curved light conductors are made of acrylic or polycarbonate it is very fast and easy to solvent bond them together using methylene chloride.

The curved panel-shaped optical conductor 25 is shown as a separate part from the flat light conductor 24 but it is possible to make these two separate parts as one.

The flat light conductor 24 in FIGS. 1 and 2 may be made of a sheet of glass, acrylic, polycarbonate of other light conductive materials. Acrylic sheet is preferred, for its good light conducting ability, and its low cost. Ordinary acrylic is easily scratched and any scratches become highlighted by emitting light (an imperfection in the boundary emits light). Scratches may be removed by polishing or hidden by waxing.

For a scratch resistant product, at a slightly higher price, it is possible to use acrylic sheets with an abrasion resistant coating. This abrasion resistant coating is put on by the manufacturer of the acrylic sheet. Manufacturing of the illumination apparatus for a digitizer tablet of the invention using the abrasion resistant acrylic is the same as with the normal acrylic except the abrasion resistant material must be removed in order to solvent bond.

The thickness of the flat light conductor 24 can be varied to suit the need. A thicker flat light conductor 24 is easier to illuminate brightly but is heavier and more expensive. A thickness, of the flat light conductor, of about 0.25 inch is generally well suited to the application. This 0.25 inch thickness can conduct enough light to adequately illuminate the largest commonly available digitizers. This 0.25 inch thickness is less than the lock height of most digitizers, so it can be used as an add-on device. Some digitizers have a spacer sheet 34 located between the grid array 22 and the working surface 31, as shown in FIG. 1, of about 0.25 inch to improve linearity of the electronic digitizing field. A 0.25 inch flat light conductor 24 of the invention can take the place of this spacer 34, for optimum design.

A variety of materials can be used for the reflector 23 in FIGS. 1 and 2. Paper or high impact styrene with a bright white color and matte finish work well. The reflector serves two important optical purposes. First, light emitted from the flat light conductor 24 is emitted up, toward the user, as well as down, away from the user. The light emitted toward the reflector is reflected back up toward the user. When the flat light conductor has an imperfect boundary on the bottom side, the reflector will increase the useful light by about 30%. Second, light is emitted by the non-optical-fiber flat light conductor 24 in somewhat concentrated spots. Using a reflector 23 which has a matte or rough surface causes the light to be reflected up from areas between the spots of concentrated light emission. This allows a surface which emits light in a granular nature to have a much finer appearance. In effect, the reflector 23 is a light diffuser which increases the light output by about 30% (as opposed to using a translucent material, on top, to diffuse light and reducing the output by perhaps 60%).

It is desirable, in order to avoid lighting aberrations, not to adhere the reflector 23 to the flat light conductor in areas where it will be seen during use of the digitizer tablet. For an add-on imperfect-boundary-containing slab waveguide of the invention, it is convenient to use a cellophane-like tape to adhere the reflector 23 to the edges of the flat conductor 24. With a built-in imperfect-boundary-containing slab waveguide of the invention, it is convenient to adhere the reflector 23 to the top digitizer layer and to hold the flat light conductor 24 in place from the edges.

The non-optical-fiber flat light conductor 24 has highly polished edges, where illumination sources are located, so that a maximum amount of light enters it. The non-optical-fiber flat light conductor 24 is made to emit light in the desired area by making its smooth external top or bottom surface optically imperfect.

Stated in somewhat different terms, slab waveguide 24 (the non-optical-fiber flat light conductor 24) has an imperfect boundary 30 (the roughened surface area 30). The theory and practice of slab waveguides with imperfect boundaries is well known in the art. For example, the book *Light Transmission Optics,* by D. Marcuse, Robert E. Krieger Publishing Company, (1989) provides a thorough treatment of slab waveguides with imperfect boundaries.

There are many ways to make the surface imperfect. Imperfections may be made by roughening the surface such as by adding material, removing material or redistributing material. It may be made imperfect by selectively applying a paint type material. Light will be emitted in the areas of the imperfections.

If the imperfections are too severe or dense, most of the light will be emitted, from the flat light conductor 24, near the light source 29. On the other hand, if the imperfections are too minor or sparse, the light will be more uniform but little light will be emitted, from the flat light conductor 24. If the imperfections are too large in size, the light will have to be diffused to make the light useable for fine detail digitizing. The non-optical-fiber flat light conductor 24 will emit useful light for back-lighting an object to be digitized 39 whether the imperfect boundary is on the top working surface, on the bottom surface facing the reflector, or if both top and bottom surfaces are imperfect.

The preferred method of making the imperfect boundary is by "particle blasting" (which is analogous to "sand blasting") the bottom side of the flat light conductor with a material which is very fine, is very hard and has sharp edges. Aluminum oxide particles approximately 150 micron in size works well for blasting, although other materials of different size and type may be used. Prior to blasting the large flat light conductor 24, it is desirable to mask the areas near the edge where illumination is not required. This is the portion of the large flat light conductor which, when installed on the digitizer, will be above the non-active digitizing area. The remaining unmasked area, the bottom side of the flat light conductor 24, is then blasted in a manner to give optimum lighting. The blasting distance and time interval required is a function of the air pressure, blast media, media feed rate, blast nozzle size, and blast nozzle shape.

Using the 150 micron aluminum oxide media, in an un-pressurized particle blaster, with a ¼ inch nozzle, and 80 PSI of air pressure it is desirable to space the blasting gun about 30 inches from the flat light conductor 24. At this distance, it is possible to blast the flat light conductor 24 in a manner that will not leave a visible pattern from the movement of the blasting gun (because the blast pattern is about a foot in diameter). While the flat light conductor 24 is blasted, the gun is moved in random, overlapping patterns so that the entire exposed surface of the flat light conductor 24 is uniformly blasted. Initial blast time will be approximately 30 seconds per square foot of flat light conductor.

After this initial uniform blasting of the flat light conductor 24, it is desirable to blast additionally in areas that are farthest from the illumination sources so that a higher density of blasting will offset the greater distance from the light source. This second blasting in the areas farthest from the light source is approximately 30 seconds per square foot. With this method, one may make flat light conductors 24 that will emit light across the surface of the flat light conductor 24 that have a sufficient uniformity that provides uniform illumination from the flat light conductor 24.

The blasting with the aluminum oxide particles results in tiny marks about 0.0002 inches in size distributed randomly in the surface of the flat light conductor 24. The marks each scatter light and provide useful illumination when the flat light conductor is illuminated from the edges. The surface between the marks remains smooth and light rays are totally internally reflected. It is an important characteristic of the surface of the non-optical-fiber flat light conductor 24 treated in this way that, although some areas have a greater density of blasting and, therefore, a denser pattern of marks, the differences are invisible to the eye.

Besides particle blasting, other suitable ways of creating a roughened surface (imperfect boundary for the slab waveguide) include: etching; grinding; sanding; painting; varying index of refraction; molding; spraying of atomized liquid or solid particles; printing of solid or liquid materials; lamination of films or other materials; and other well known methods of obtaining an optically imperfect boundary.

Figures 3, 4:
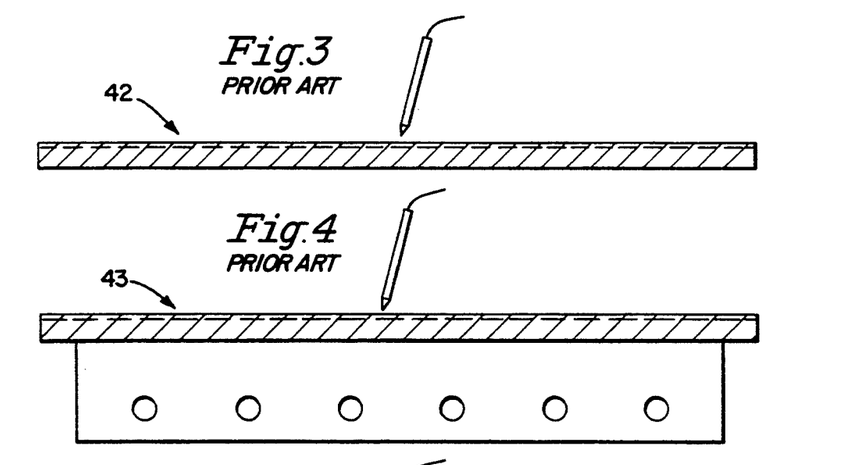
FIG. 3 is a cross-section of a typical Prior Art opaque digitizer tablet.
FIG. 4 is a cross-section of a typical Prior Art back-lit digitizer tablet.

For purposes of comparison, FIG. 3 shows a cross-section of a typical prior art opaque digitizer tablet 42.

For purposes of comparison, FIG. 4 shows a cross-section of a typical prior art back-lit digitizer tablet 43.

FIG. 5 shows a cross-section of part of a typical opaque digitizer tablet with the invention 44 added-on.

Figure 6:
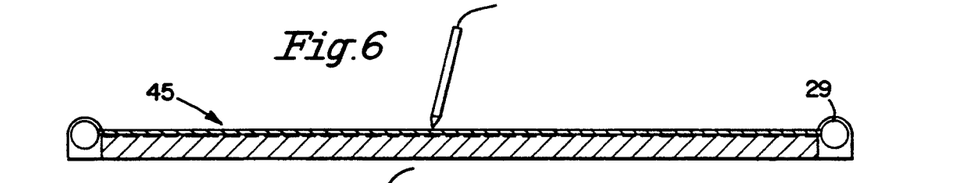
FIG. 6 is a cross-section of an opaque digitizer tablet with the illumination apparatus of the invention built in and with the light source in the same plane as the non-optical-fiber flat light conductor. No panel-shaped optical conveyance is used between the light source and the non-optical-fiber flat light conductor.

FIG. 6 shows a cross-section of an opaque digitizer tablet with the invention 45 built-in. The lamps are in the same plane as the flat light conductor and no panel-shaped optical conveyance is used.

FIG. 7 shows a cross-section of part of an opaque digitizer tablet with the invention 46 built-in. The lamps are located in a plane below the flat light conductor and a curved panel-shaped optical conveyance is used.

FIG. 8 shows part of a cross-section of an opaque digitizer tablet with the invention 49 built-in. The lamps are located in the same plane as the flat light conductor and a flat panel-shaped optical conveyance is used.

FIGS. 9, 10, 11, and 12 show recommended lamp locations and blasting patterns for obtaining bright and uniform lighting on several different size flat light conductors 24 using 24 inch aperture fluorescent lamps. These configurations are valid for either add-on imperfect-boundary-containing slab waveguides of the invention or a built-in imperfect-boundary-containing slab waveguide of the invention. The embodiments shown in FIGS. 9, 10, 11 and 12 are merely representative. In other embodiments, other size lamps may be used, lamps may be located in different locations, lamp spacing may be changed, other blasting patterns may be used and other sizes may be made.

Figure 9:
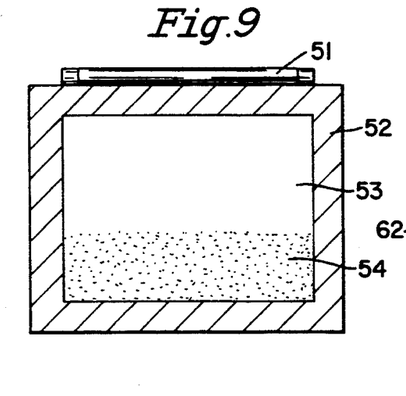
FIGS. 9, 10, 11, and 12 show lamp placement for even illumination on a 17×24 inch, 24×36 inch, 36×48 inch, 44×60 inch size digitizers respectively.

FIG. 9 represents a flat light conductor for a 17×24 inch digitizer with a 24 inch lamp 51. The area 52 is the portion outside the active area of the digitizer which is masked during blasting so that it will not emit light. Areas 53 and 54 are not masked. Areas 53 and 54 are not masked during roughening (blasting). Areas 53 and 54 are first blasted uniformly and then area 54 is blasted additionally to improve light uniformity.

Figure 10:
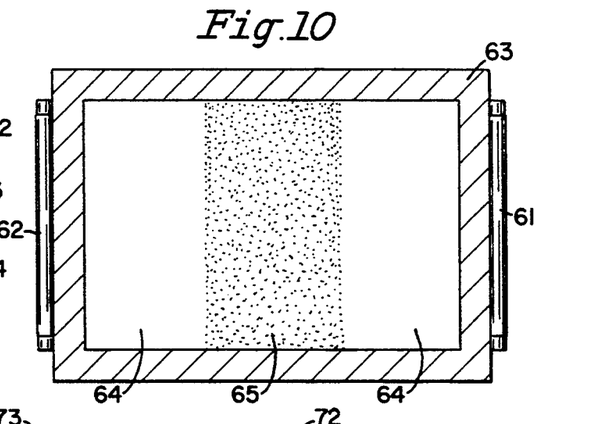

FIG. 10 represents a flat light conductor for a 24×36 inch digitizer with 24 inch lamps 61 and 62. The area 63 is the portion outside the active area of the digitizer which is masked during roughening (blasting) so that it will not emit light. Areas 64 and 65 are not masked. Areas 64 and 65 are first roughened (blasted) uniformly and then area 65 is roughened (blasted) additionally to improve light uniformity.

Figure 11:
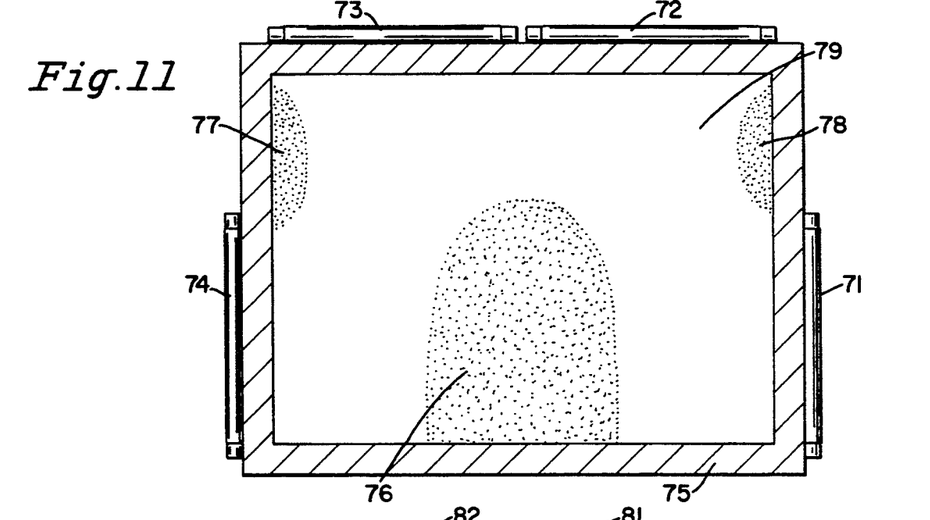

FIG. 11 represents a flat light conductor for a 36×48 inch digitizer with 24 inch lamps 71, 72, 73 and 74. The area 75 is the portion outside the active area of the digitizer which is masked during roughening (blasting) so that it will not emit light. Areas 76, 77, 78 and 79 are not masked. Areas 76, 77, 78 and 79 are first roughened (blasted) uniformly and then areas 76, 77 and 78 are roughened (blasted) additionally to improve light uniformity.

Figure 12:
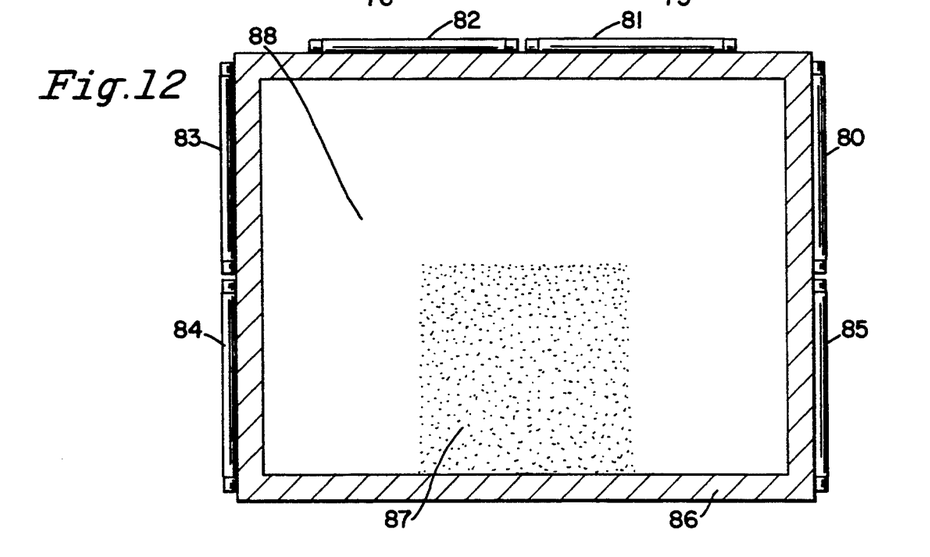

FIG. 12 represents a flat light conductor for a 44×60 inch digitizer with 24 inch lamps 80, 81, 82, 83, 84 and 85. The area 86 is the portion outside the active area of the digitizer which is masked during roughening (blasting) so that it will not emit light. Areas 87 and 88 are not masked. Areas 87 and 88 are first roughened (blasted) uniformly, and then area 87 is blasted additionally to improve light uniformity.

Lamp placement, and the number of lamps are a function of the size of the lamp used as well as the size of the illumination area. One 1.5 inch diameter 24 inch long aperture fluorescent lamp provides enough light to adequately illuminate about 3 square feet of flat light conductor 24. With this formula, one uses one 24 inch lamp for a 17×24 inch digitizer, two 24 inch lamps for a 24×36 inch digitizer four 24 inch lamps for a 36×48 inch digitizer, and six 24 inch lamps for a 44×60 inch digitizer.

Accordingly, FIG. 9 shows lamp placement for a 17×24 inch digitizer. FIG. 10 shows lamp placement for a 24×36 inch digitizer. For a digitizer of this size it is desirable to illuminate from at least two sides to get uniform and bright illumination. FIG. 11 shows lamp placement for a 36×48 inch digitizer. For a digitizer of this size it is desirable to illuminate from at least three sides to get uniform and bright illumination. FIG. 12 shows lamp placement for a 44×60 inch digitizer. For a digitizer of this size it is desirable to illuminate from at least three sides to get uniform and bright illumination. Leaving one side without lamps is desirable so the operator can work from a side that has no heat dissipated.

An advantage of the illumination apparatus for a digitizer tablet of the invention is that the lamps need not exactly match the size of the illumination area because the light tends to spread out within the panel-shaped optical conductor 25 and the flat light conductors 24.

Figure 13:
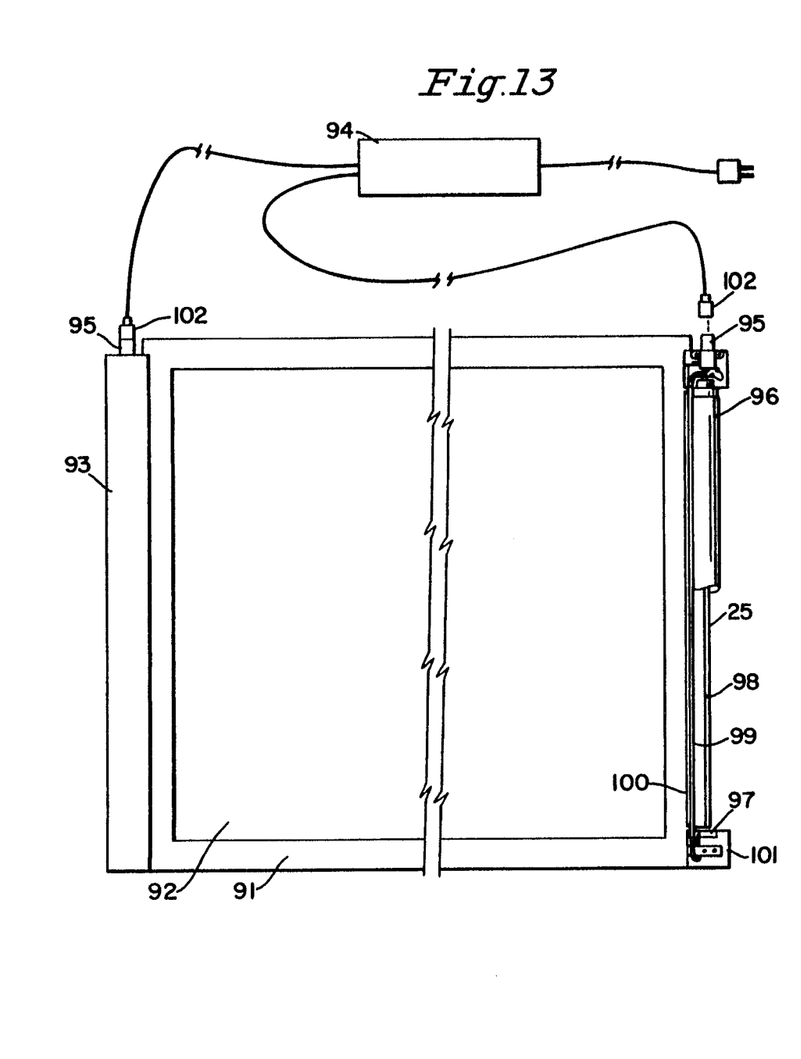
FIG. 13 is a top view of a 24×36 inch illumination apparatus with an add-on imperfect-boundary-containing slab waveguide of the invention; one lamp cover is removed.

FIG. 13 shows an add-on illumination apparatus for a digitizer tablet of the invention for a 24×36 inch digitizer. Area 92 is the portion on the flat light conductor which emits light useful for back-lit digitizing. Area 92 measures 24×36 inches. Area 91 is the portion of the flat light conductor which does not emit light. Lamp cover 93 covers one lamp, its associated wiring and the curved panel-shaped optical conductor 25. Lamp 96 is partly shown because its lamp cover is removed. The curved panel-shaped optical conductor 25 can be partly seen, and an expansion gap 98 is shown. The lamp ballast 94 draws power from a standard AC power outlet. The ballast's output is fed through cables and attached through connectors 102 to 95. For an add-on imperfect-boundary-containing slab waveguide, the ballast would likely be placed on the floor, close to the digitizer. For a built-in imperfect-boundary-containing slab waveguide, the ballast would likely be attached to the back side of the digitizer.

The lamps are operated in close proximity to the digitizer without any intervening magnetic shielding. When the lamps are powered by a conventional choke ballast operating at 50/60 Hz, they produce electromagnetic fields which will interfere with most, but not all, digitizers. This is because digitizers vary from type to type in their operating frequencies and detection schemes. The problem is solved by using a high frequency electronic type ballast compatible with the characteristics of the digitizer. The electronic ballasts tend to cost more but offer advantages of light weight, high efficiency and flicker free operation.

There are a great variety of fluorescent lamp ballasts available. Standard models are offered with 0.4 amp "normal" current, 0.8 amp "High Output" current as well as 1.5 amp "Very High Output" current. Some ballasts have variable current capability. The illumination apparatus for a digitizer tablet of the invention may require the use of the higher current ballasts, depending on the efficiency of the optics, the opacity of the object being digitized and the brightness of the ambient room illumination. In general, a guiding principle in choosing a ballast is to operate the fluorescent lamp at a frequency that differs from the operating frequency of the digitizer so the lamp does not interfere with the operation of the digitizer.

Figure 14:
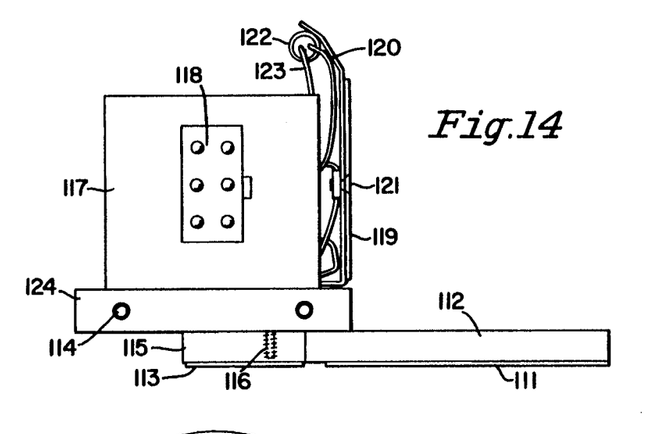
FIG. 14 is an edge view of one corner of an illumination apparatus, from the connector side, which includes an add-on imperfect-boundary-containing slab waveguide of the invention.

FIG. 14 shows a close up of the connector area of an add-on imperfect-boundary-containing slab waveguide. Reflector 111 is underneath flat light conductor 112. The flat light conductor 112 is solvent bonded to the flat support structure 124. The flat support structure 124 is made of acrylic or polycarbonate plastic and measures 2×2.25×3/8 inches thick. To the flat support structure 124 are attached the connector bracket 117 and wiring bracket 120, both made of sheet steel. In the connector bracket 117 is the connector socket 118. The connector socket passes a ground wire plus the four wires required to operate one rapid start aperture fluorescent lamp. Wiring bracket 120 has a hole to allow bolt 121 to fix light shield 119 in place. Tube 122 carries two wires 123 to the far end of the lamp and is made of steel and is welded to wiring bracket 120. Foot 115 is made of acrylic or polycarbonate plastic and measures 1×2 inches. The thickness of the foot 115 is the same as the thickness of flat light conductor 112. The foot 115 is held in place, from above, by screw 116. Foot 115 has attached to it a double stick foam tape 113 which is of the same thickness as the reflector 111. The foam tape 113 is used to hold the add-on imperfect-boundary-containing slab waveguide to the digitizer tablet. Removing screw 116 allows the imperfect-boundary-containing slab waveguide assembly to be removed from the digitizer tablet, leaving the foot 115 in place, ready for re-attachment. If a foot with double stick adhesive is used under each end of each lamp, the imperfect-boundary-containing slab waveguide assembly will be securely held in place. However, depending on use angle, weight and the adhesive used, it may require larger feet with sufficient double stick tape to keep the imperfect-boundary-containing slab waveguide from gradually shifting over time.

Figure 15:
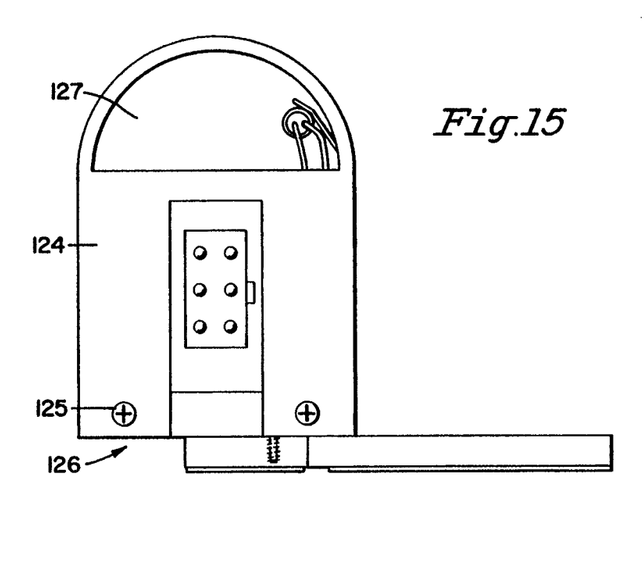
FIG. 15 is the same view as FIG. 14 with the lamp cover in place.

FIG. 15 is the same embodiment of the invention as shown in FIG. 14 except the lamp cover 124 is in place and is secured with screws 125. The lamp inside is cooled by convection of air entering at opening 126 and exiting at opening 127.

FIG. 16 is a top view of the lamp area of an add-on imperfect-boundary-containing slab waveguide of the invention. Curved panel-shaped optical conductor 142, with expansion gap 141 is solvent bonded to flat light conductor 139. Connector 132 is held in place by connector bracket 131 which is screwed to support structure 130. Two wires 135 from connector 132 go through tube 137 to lamp socket 143 which is held to support 146 by socket bracket 144. Screws 133 and 145 hold the feet (described with respect to FIG. 14) in place. Lamp 140 is held by lamp sockets 143 and 148. Light shield 138 is attached to brackets 136 and 149 which holds tube 137. Wire 134 grounds tube 137 which serves as a lamp starting aid.

It is apparent from the above that the present invention accomplishes all of the objects set forth by providing a new and improved illumination apparatus for a digitizer tablet that is low in cost, relatively simple in design and operation, and which may be advantageously used to back-light the material placed on a digitizing tablet for easier viewing while digitizing. Also, with the invention, an ordinary opaque digitizer can be upgraded, by the user, for back-lit digitizing. With the invention, lamps need not be placed under the working surface. With the invention, cooling fans are not required so operation is silent and maintenance is reduced. The illumination apparatus for a digitizer tablet of the invention can be safely used with an inexpensive drafting pedestal. The illumination apparatus for a digitizer tablet of the invention can be used with digitizers having grids that are too opaque to be back-lit. The illumination apparatus for a digitizer tablet of the invention can be used with digitizers having inexpensive, and accurate grids which are difficult to back-light.

With the invention, the digitizer structure need not conduct light, so it can be made of inexpensive, durable and rigid materials. With the invention, an illumination apparatus for a digitizer tablet is provided that employs few lamps. With the invention, power consumption is low. With the invention, few parts are required. With the invention, an illumination apparatus for a digitizer tablet is provided that will not heat the working surface. The illumination apparatus for a digitizer tablet of the invention does not employ adhesives or potting compounds, which might yellow or darken, so that the illumination of the working surface dims with age. With the invention, an illumination apparatus for a digitizer tablet is provided that is light weight and has a thin profile.

With the invention, an illumination apparatus for a digitizer tablet is provided that has a center of mass close to the mounting point. The invention is relatively low in cost. The invention produces a light whose colors are close to natural sunlight. The invention precludes the presence of shadows or rainbows. With the invention, an illumination apparatus for a digitizer tablet is provided that has a lighting surface of uniform thickness. With the invention, the illuminating surface is non-compressible. The illumination apparatus for a digitizer tablet of the invention is simple to manufacture. With the invention, light spreads evenly with uneven light sources, and without the need for diffusers which would block light.

The foregoing description of the invention has been presented for purposes of illustration and description. It is not intended to be exhaustive or to limit the invention to the precise form disclosed. Furthermore, obvious modifications or variations of the illumination apparatus for a digitizer tablet of the invention are possible in light of the above teachings. The embodiments were chosen and described in order to best illustrate the principals of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. An illumination apparatus for a digitizer tablet which has a hand-held digitizing member and an associated conductor arrangement embedded in the tablet, said apparatus comprising:
   a non-optical-fiber flat light conductor located on top of and covering the conductor arrangement embedded in the digitizer tablet, said non-optical-fiber flat light conductor including a top surface, a bottom surface, and a light-receiving edge, and
   a light source located peripheral to said non-optical-fiber flat light conductor, said light source providing light to said light-receiving edge of said non-optical-fiber flat light conductor, wherein a portion of light received by said light-receiving edge from said light source is emitted from said top surface for back lighting an object to be digitized that is placed over said non-optical-fiber flat light conductor.

2. The apparatus described in claim 1 wherein said light source is an aperture fluorescent lamp.

3. The apparatus described in claim 2 wherein said aperture fluorescent lamp includes an outer transparent tube, an internal reflective coating, and an aperture in the internal reflective coating.

4. The apparatus described in claim 1 wherein said light source is located beside said non-optical-fiber flat light conductor.

5. The apparatus described in claim 1 wherein said light source is located above said non-optical-fiber flat light conductor.

6. The apparatus described in claim 1 wherein said non-optical-fiber flat light conductor includes a surface which includes roughened portions, such that when said non-optical-fiber flat light conductor is illuminated it gives the appearance of uniform illumination.

7. The apparatus described in claim 6 wherein said roughened surface of said non-optical-fiber flat light conductor includes a nonhomogeneous pattern of roughness, such that when said non-optical-fiber flat light conductor is illuminated it gives the appearance of uniform illumination.

8. The apparatus described in claim 7 wherein said nonhomogeneous pattern of roughness includes a region of lesser roughness nearer to said light source and a region of greater roughness farther from said light source, such that when said non-optical-fiber flat light conductor is illuminated it gives the appearance of uniform illumination.

9. The apparatus described in claim 7 wherein said nonhomogeneous pattern of roughness includes a continuum of lesser to greater roughness extending from nearer to said light source to farther away from said light source, such that when said non-optical-fiber flat light conductor is illuminated it gives the appearance of uniform illumination.

10. The apparatus described in claim 1, further including:
    panel-shaped optical conveyance means for conveying light from said light source to said light-receiving edge of said non-optical-fiber flat light conductor.

11. The apparatus described in claim 10 wherein said light source includes an aperture fluorescent lamp, and wherein the aperture of said aperture fluorescent lamp is wider than an adjacent end of said panel-shaped optical conveyance means.

12. The apparatus described in claim 10 wherein said panel-shaped optical conveyance means include expansion slots in one surface of said panel-shaped optical conveyance means, said expansion slots permitting said panel-shaped optical conveyance means to expand without warping when heated by light from said light source.

13. The apparatus described in claim 10 wherein:
said panel-shaped optical conveyance means include a first edge portion located in a plane which is parallel to an edge of said non-optical-fiber flat light conductor and a second edge portion located in a plane adjacent to and facing a portion of said light source,
said panel-shaped optical conveyance means conveys light from said portion of said light source adjacent to and facing said second edge portion of said panel-shaped optical conveyance means to said edge of said non-optical-fiber flat light conductor.

14. The apparatus described in claim 13 wherein said first edge portion and said second edge portion of said panel-shaped optical conveyance means and said portion of said light source adjacent to and facing said second edge portion are coplanar.

15. The apparatus described in claim 13 wherein said first edge portion of said panel-shaped optical conveyance means is in a plane below said second edge portion of said panel-shaped optical conveyance means and said portion of said light source adjacent to and facing said second edge portion.

16. The apparatus described in claim 13 wherein said first edge portion of said panel-shaped optical conveyance means is in a plane above said second edge portion of said panel-shaped optical conveyance means and said portion of said light source adjacent to and facing said second edge portion.

17. The apparatus described in claim 10 wherein:
said panel-shaped optical conveyance means includes a curved cross-sectional contour,
said curved panel-shaped optical conveyance means conveys light from said portion of said light source adjacent to and facing said second edge portion, located above said non-optical-fiber flat light conductor, to an edge of said non-optical-fiber flat light conductor.

18. The apparatus described in claim 10 wherein:
said panel-shaped optical conveyance means include an input end and an output end, said input end and said output end oriented with respect to each other such that an angle therebetween, with reference to said top surface of the non-optical-fiber flat light conductor, is an angle in a range of 0–180 degrees, and
said angled panel-shaped optical conveyance means convey light from said light source to an edge of said non-optical-fiber flat light conductor.

19. The apparatus described in claim 10 wherein light is conveyed through said panel-shaped optical conveyance means by total internal reflection.

20. The apparatus described in claim 1 wherein a portion of the light entering said non-optical-fiber flat light conductor undergoes total internal reflection within said non-optical-fiber flat light conductor, and a portion of the light conveyed in said non-optical-fiber flat light conductor is scattered at a roughened surface and emerges from a top surface of said non-optical-fiber flat light conductor.

21. The apparatus described in claim 1 wherein:
a perimeter portion of said bottom surface of said non-optical-fiber flat light conductor is smooth and provides total internal reflection, and
an interior portion of said bottom surface of said non-optical-fiber flat light conductor is roughened and permits light to be scattered and emerge upward to the object to be digitized.

22. The apparatus described in claim 1, further including:
a light shield located between said light source and said top surface of said non-optical-fiber flat light conductor for preventing light from said light source from entering said non-optical-fiber flat light conductor from said top surface of said non-optical-fiber flat light conductor.

23. The apparatus described in claim 1, further including a reflective surface located beneath said non-optical-fiber flat light conductor for reflecting scattered light, that emerges from a roughened bottom surface of said non-optical-fiber flat light conductor, toward the object to be digitized.

24. The apparatus described in claim 23 wherein said reflective surface includes a matted surface.

25. An illumination apparatus for a digitizer tablet which has a hand-held digitizing member and an associated conductor arrangement embedded in the tablet, said apparatus comprising:
a light source located peripheral to a portion of a digitizer working surface used for placement of an object to be digitized, wherein said light source is an aperture fluorescent lamp, and
a non-optical-fiber flat light conductor located on top of and covering the portion of the working surface used for placement upon of an object to be digitized, wherein said non-optical-fiber flat light conductor includes a bottom surface which includes roughened portions, wherein said non-optical-fiber flat light conductor receives light from said light source, wherein a portion of the light entering said non-optical-fiber flat light conductor undergoes total internal reflection within said non-optical-fiber flat light conductor, and a portion of the light is conveyed in said non-optical-fiber flat light conductor to said roughened portions and is scattered by said roughened portions and emerges from a top surface of said non-optical-fiber flat light conductor, wherein light emerging from said top surface of said non-optical-fiber flat light conductor serves to illuminate, by back lighting, an object to be digitized placed on the top surface of said non-optical-fiber flat light conductor,
panel-shaped optical conveyance means for conveying light from said light source to an edge of said non-optical-fiber flat light conductor, wherein said panel-shaped optical conveyance means include a first portion located in a plane of said non-optical-fiber flat light conductor and a second portion located in a plane above said plane of said non-optical-fiber flat light conductor adjacent to said light source, and wherein said panel-shaped optical conveyance means conveys light from said light source, in a plane above said plane of said non-optical-fiber flat light conductor, to an edge of said non-optical-fiber flat light conductor, and
a reflective surface located between the working surface of the digitizer tablet and said non-optical-fiber flat light conductor for reflecting scattered light, that emerges from a roughened bottom surface of said non-optical-fiber flat light conductor, toward the object to be digitized.

26. An illumination apparatus for a digitizer tablet which has a hand-held digitizing member and an associated conductor arrangement embedded in the tablet, said apparatus comprising:
- an aperture fluorescent lamp, and
- a non-optical-fiber flat light conductor located on top of and covering the conductor arrangement embedded in the tablet, wherein said non-optical-fiber flat light conductor includes a bottom surface which includes roughened portions, wherein said non-optical-fiber flat light conductor receives light from said aperture fluorescent lamp, wherein a portion of the light entering said non-optical-fiber flat light conductor undergoes total internal reflection within said non-optical-fiber flat light conductor, and a portion of the light conveyed in said non-optical-fiber flat light conductor is scattered by said roughened bottom portions, and
- a reflective surface located beneath said non-optical-fiber flat light conductor for reflecting scattered light, that emerges from the bottom surface of said non-optical-fiber flat light conductor, toward the object to be digitized, such that light emerges from a top surface of said non-optical-fiber flat light conductor, wherein light emerging from said top surface of said non-optical-fiber flat light conductor serves to illuminate, by back lighting, an object to be digitized placed on the top surface of said non-optical-fiber flat light conductor.

27. An illumination apparatus for a digitizer tablet which has a hand-held digitizing member and an associated conductor arrangement embedded in the tablet, said apparatus comprising:
- an aperture fluorescent lamp and
- a slab waveguide with an imperfect boundary, said slab waveguide located on top of and covering the conductor arrangement embedded in the tablet, said imperfect-boundary-containing slab waveguide including a top surface, a bottom surface, and a light-receiving edge, wherein a portion of light received by said light-receiving edge from said aperture fluorescent lamp is emitted from said top surface for back lighting an object to be digitized placed over said slab waveguide.

28. The apparatus described in claim 27 wherein said imperfect boundary of said slab waveguide is on said bottom surface of said slab waveguide.

29. The apparatus described in claim 27, further including:
- panel-shaped optical conveyance means for conveying light from said aperture fluorescent lamp to said light-receiving edge of said imperfect-boundary-containing slab waveguide.

30. The apparatus described in claim 27, further including a reflective surface located beneath said imperfect-boundary-containing slab waveguide for reflecting scattered light, that emerges from an imperfect-boundary-containing bottom surface of said slab waveguide toward the object to be digitized.

* * * * *